March 26, 1935.  G. SCHWAB  1,996,012
MELTING FURNACE
Filed Sept. 24, 1931   3 Sheets-Sheet 3
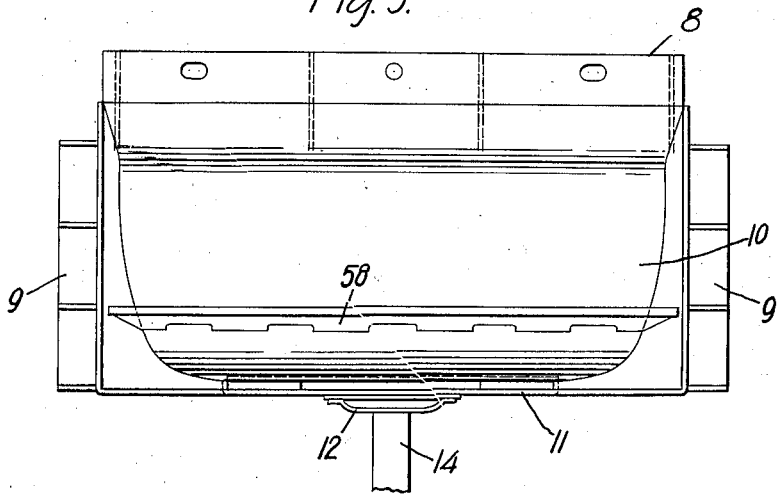
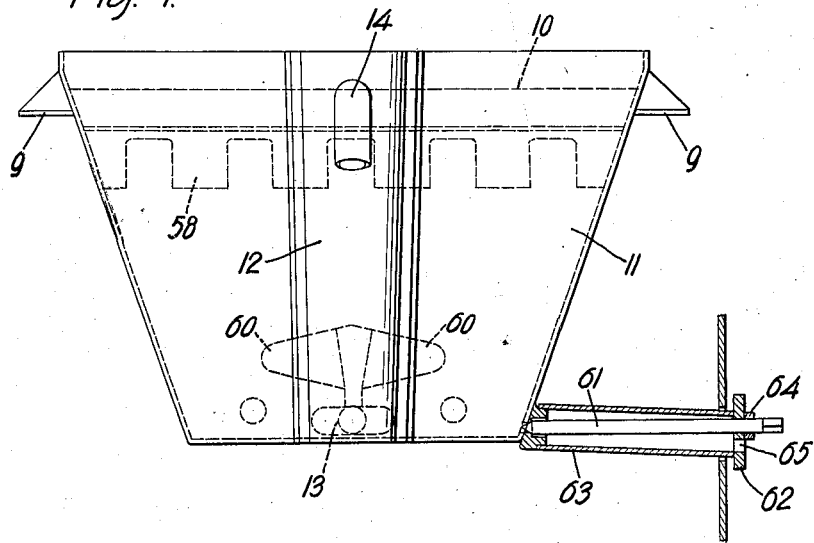
INVENTOR
Gustav Schwab.
BY Moses & Nolte
ATTORNEYS Patented Mar. 26, 1935

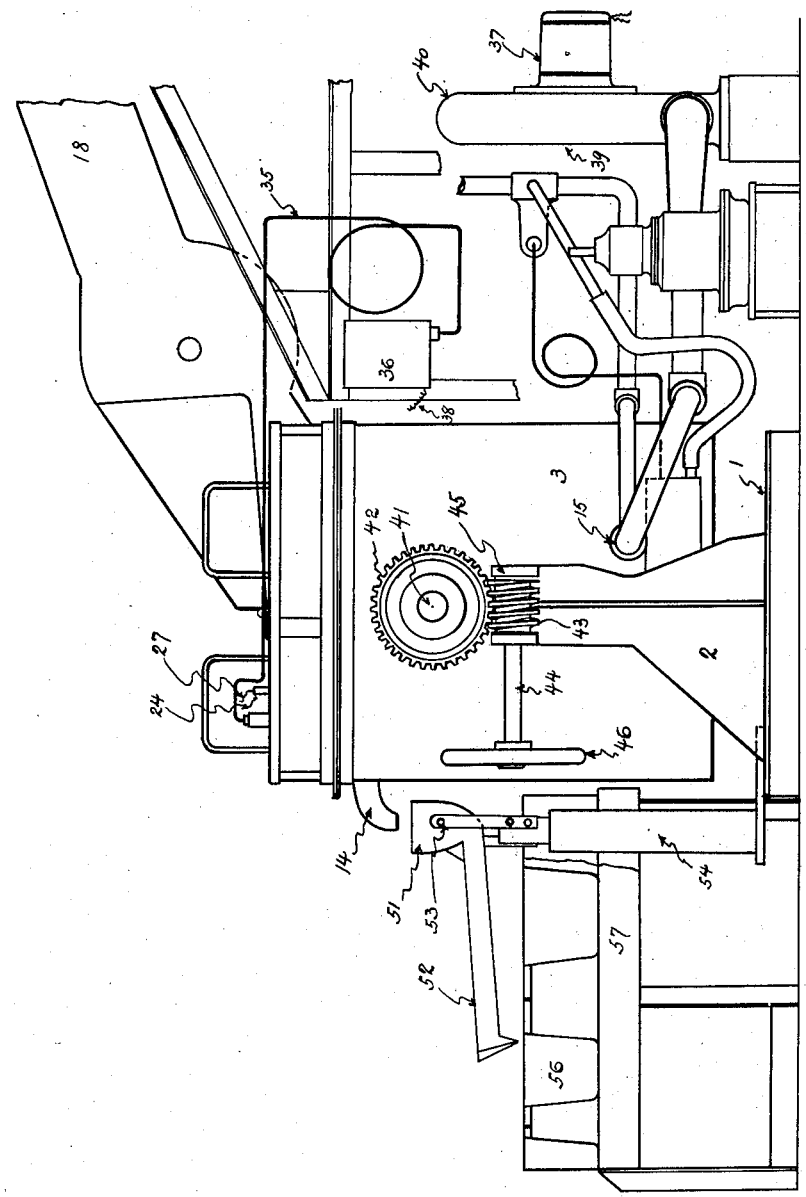

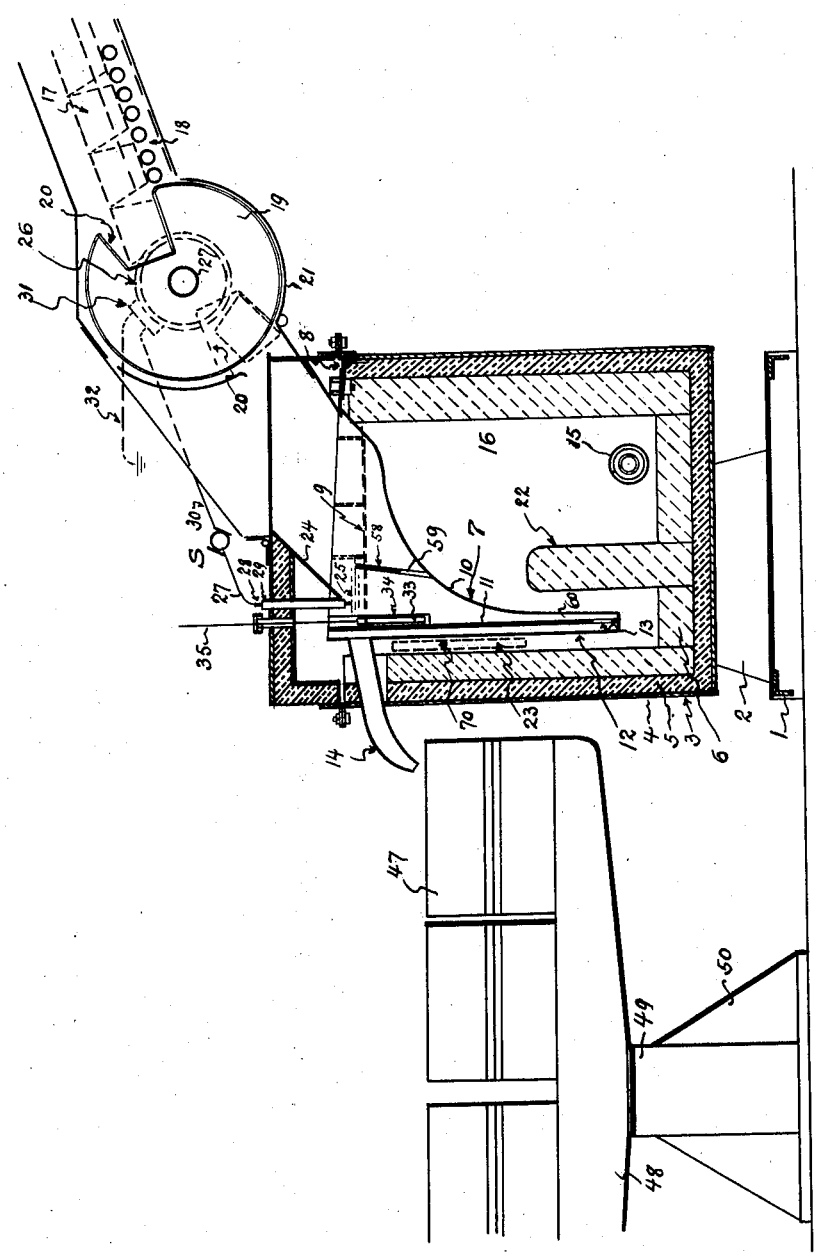

1,996,012

UNITED STATES PATENT OFFICE 1,996,012

MELTING FURNACE

Gustav Schwab, Townley-Elizabeth, N. J., assignor of one-third to Albert C. Nolte, New York, N. Y.

Application September 24, 1931, Serial No. 564,955

6 Claims. (Cl. 263—11)

This invention relates to melting furnaces for metals, and has for its primary object to contrive a furnace in which the metal may be quickly brought to the desired temperature, and which may, itself, be heated to operating temperature quickly.

It is a further object of the invention to provide a furnace adapted to discharge the molten metal continuously and at a substantially uniform, predetermined rate, together with means controlled by the metal, itself, for feeding fresh material to the melting pot of the furnace at a corresponding rate.

It is a further object of the invention to provide automatic means controlled by the temperature of the metal for regulating the furnace heater so that the charge flowing through the furnace continuously will be heated vigorously enough to assure its reaching the desired temperature, but will not be heated above such temperature.

It is a further object of the invention to provide a melting pot of small capacity, of strong construction, and of a shape to expose a large surface to the heating means in proportion to the volume of metal to be heated.

It is a feature of the invention that the combustion gases which heat the furnace are discharged through a flue for delivering metal to the melting pot, so that the exhaust gases preheat the metal.

Other objects and advantages will hereinafter appear.

In the drawings forming part of this specification:

Figure 1 is a view in side elevation illustrating one embodiment of the invention;

Figure 2 is a sectional, side elevation of a machine generally like that of Figure 1, but differing in some respects from it;

Figure 3 is a plan view of the melting pot as illustrated in Figure 2; and

Figure 4 is an end elevation of the melting pot.

Since the machines of Figure 1 and of Figures 2 to 4 are alike in most respects, the features common to them will be first described, and the details in which the Figure 1 machine differs from the Figure 2 machine will be thereafter pointed out.

The machine comprises a fixed base 1 carrying standards 2 on which the furnace 3 is pivotally supported. The furnace comprises an outer metallic casing 4, an insulating lining 5, and a refractory lining 6. A melting pot 7 is supported within the furnace upon flanged brackets 8 and 9. As seen best in Figure 4, the melting pot is of substantial width at its top and tapers toward the bottom when viewed in front elevation. As viewed in side elevation, the melting pot is wide at the top, but the lower wall 10 thereof is curved or arched and approaches the wall 11 until it is very close to it. Throughout the lower portion of the melting pot the walls 10 and 11 stand close together and in substantially parallel relation. The wall 11 has a discharge conduit 12 welded to its outer face, and a port 13 near the bottom of the melting pot, and the conduit 12, provides communication between the melting pot and the conduit. At the upper end of the conduit 12 provision is made of a pouring spout 14 whose effective cross sectional area or flow capacity is substantially the same as the effective cross sectional area or flow capacity of the conduit 12. A burner 15 is provided within the burner chamber 16 of the furnace and supplies combustion gases for heating the furnace.

Slugs or pigs of metal 17 are fed to the melting pot along a gravity roller conveyor 18, the frequency of delivery being controlled by a separator cylinder disc 19 which has pig receiving recesses 20 formed in the periphery thereof. The cylinder 19 and the conveyor 18 are contained within a housing or flue 21 through which the combustion gases from the burner are discharged. The combustion gases rising from the burner come into contact with the arched wall 10 of the melting pot, and thence pass downward between said wall and a baffle 22 around the lower end of the melting pot. The gases then travel upward through a passage 23 in contact with the wall 11 of the melting pot and with the outer surface of the conduit 12 to the upper part of the furnace, whence they are directed by a baffle plate 24 downward into contact with the surface 25 of the molten metal in the melting pot. From the furnace the gases pass to the flue 21 for preheating the incoming charges.

It is intended that the metal shall be supplied to the melting pot as fast as the pouring spout 14 is capable of discharging it when operating continuously. If the metal were delivered at a faster rate for any substantial time, the melting pot would be caused to overflow. In order to prevent an accident of this character, provision is made of a motor 26 which, through reduction gearing, drives a shaft 27 on which the separator cylinder 19 is made fast, and provision is made of means controlled by the level of the molten metal for regulating the operation of the motor 26. Such automatic means comprises a suitable source of current S having one of its terminals connected by a conductor 27 to a conductive rod 28 that extends through an insulating sleeve 29 into proximity to the normal level of the molten metal. The opposite terminal of the current source is connected through a conductor 30 to one of the terminals of a motor switch operating device 31, the opposite terminal being grounded through a suitable conductor 32 to the furnace. When the incoming charges cause the metal to accumulate more rapidly than it can be discharged through the pouring spout 14, the level of the metal rises into contact with the tip of conductor 28 and completes the circuit of the motor switch controlling device 31, thereby causing the motor to be stopped so that no further metal charge will be delivered until the level of the metal in the melting pot has fallen. As soon as the metal in the melting pot leaves contact with the conductor 28, the motor is again energized and rotates the cylinder 19 to cause further charges to be delivered until the metal has again been brought into contact with conductor 28.

Provision is also made of means for automatically controlling the rate at which heat is supplied to the furnace in order that the metal may be brought to a predetermined temperature with whatever rapidity is required in accordance with the rate of travel of the metal through the melting pot. To this end a temperature responsive element 33 is mounted in a well 34 formed in the melting pot and communicates through a capillary tube 35 with a temperature indicator 36. The temperature indicator includes a Bourdon coil (not shown) which carries one element of a switch for making and breaking the circuit of a motor 37. Insulated wiring 38 connects the switch in circuit with the motor 37. The motor 37 when operated runs a blower fan 39 mounted in a housing 40 to supply air to the burner 15.

The operation of the fan causes an increased supply of air to be furnished to the burner. Provision is made in the air conduit of a diaphragm which carries a gas regulating valve. The increased pressure in the air conduit caused by operation of the fan moves the diaphragm to open the gas regulating valve, and thereby proportions the delivery of gas to the increased delivery of air. When the fan is stopped the diaphragm returns to normal, non-operating position, and thereby shuts off the main supply of gas. Provision is made, however, for keeping a pilot flame going at all times and for preventing the turning on of the main gas supply in case the pilot flame accidentally goes out.

While the machine may be operated with the automatic features above described, it also has important advantages when used without the automatic feeder and without the continuous discharge feature. It is in order to enable the operator to effect intermittent discharge that the furnace is pivotally mounted on the standards 2. To this end one of the trunnions 41 has fast thereon a worm wheel 42 adapted to be driven by a worm 43 which is carried by a shaft 44 journaled in ears 45 of the standard 2. A wheel 46 is provided on the shaft 44 for rotating the shaft to tilt the furnace.

As thus far described, the machines of Figures 1 and 2 may be alike in all respects. In the machine of Figure 2, however, the pouring spout 14 discharges directly into one of a series of flasks 47 which are placed upon a revolving table 48 and are adapted to be filled successively. The table 48 is provided with a center post 49 which is journaled in a fixed base member 50.

In the machine of Figure 1 the pouring spout 14 discharges into a funnel portion 51 of a trough 52 which is pivotally supported by a yoke 53. The yoke 53 is fixed on the upper end of an upright shaft 54. The shaft 54 with the parts supported thereby may be rotated at will by the operator to locate the lower discharge end of the trough 52 over any one of a series of molds 56 which are arcuately arranged upon a table 57.

The furnace as described is highly efficient in operation and is particularly characterized by its capability of being started into operation quickly and of heating the metal contained in it quickly to the desired temperature. The incoming metal is deposited in the upper part of the melting pot to the right of a baffle 58. This baffle has an opening 59 in the lower portion of it through which the melted metal may flow. The baffle prevents the incoming metal from reaching contact with the well 34 before it has had an opportunity to be heated. The molten metal passes downward around a baffle 60 through the thin and relatively narrow portion of the melting pot, and thence upward through the conduit 12. The shape of the melting pot wall 10 is regarded as a feature of substantial importance. It is of arched shape, and hence may be made strong though thin. The arched contour presents a large heat absorbing surface to the burner chamber, and at the same time greatly reduces the volume of the melting pot, and thereby reduces the mass of the metal which may be contained in the melting pot. The wedge shape imparted to the melting pot is also of importance in that it prevents the distortion or cracking of the melting pot by the expanding congealed metal when the furnace is first started into operation after being shut down. When the furnace is shut down, it is not ordinarily drained. Provision is made, however, of a needle valve 61 controlling an opening in the bottom of the side of the melting pot which may be operated to permit the metal contained in the melting pot to drain out when desired. This needle valve is threaded in a portion of its length, the thread being adapted to cooperate with an internal thread formed in a plate 62 which covers the end of a tube 63 for conducting the metal away from the melting pot. A lock nut 64 may be provided for retaining the needle valve in closed position. The plate 62 has a discharge orifice 65 formed therein. The needle valve may be provided with a square end so that a wrench may be applied to operate it.

Provision is made of an additional heating means 70 herein shown as an electrical heating element adjacent the conduit 12 for supplying additional heat when the furnace is used for securing a temperature so high that it is outside the range of temperatures normally required.

I have described what I believe to be the best embodiments of my invention. I do not wish, however, to be confined to the embodiments shown, but what I desire to cover by Letters Patent is set forth in the appended claims.

I claim:
1. In a melting furnace, in combination, a heater chamber, and a melting pot disposed within the chamber, one end wall of the melting pot being substantially straight, and another end wall being arched and extending for a substantial distance at its lower end closely adjacent to, and in substantial parallelism with, the first-mentioned end wall and a riser conduit, for dis- charge of the molten material, in contact with said straight wall, said riser conduit communicating with the bottom of the melting pot and having an outlet at the upper end thereof located not substantially above the arched portion of said arched wall.

2. In a melting furnace, a melting pot of substantial width at the mouth but greatly restricted in cross section to form a flattened passage in the lower portion thereof, a discharge conduit communicating with the pot at the lower end thereof and extending upward along a wall of the melting pot, and a discharge spout at the upper end of the conduit having substantially the same flow capacity as the conduit.

3. A melting furnace as set forth in claim 2, in which provision is made of a chamber having a burner therein, and baffle means for causing the combustion gases to pass downward along one wall of the melting pot and thence upward through a discharge passage along the opposite wall, said discharge conduit being secured against the latter wall.

4. A melting furnace as set forth in claim 2, in which provision is made of a burner, means for causing the combustion gases to pass first downward along one wall of the melting pot, thence upward along the opposite wall along the top of the metal in the pot, and finally through a flue in which the incoming charges are preheated by the gases.

5. In a melting furnace, in combination, a melting pot, a heating chamber for supplying heat to the melting pot, a heater therein, a conduit extending upward from the heating chamber and the melting pot for discharging gases from the heating chamber, the heater being effective to maintain a flow of gases in the conduit away from the melting pot, means for storing charges of material in said conduit, and means for causing the charges to be delivered intermittently to the melting pot.

6. In a melting furnace, in combination, a heating chamber, a melting pot therein, a burner in the heating chamber, a flue for conducting combustion gases away from the heating chamber, said flue communicating with the surface of said melting pot, the heater being effective to maintain a flow of gases in said flue away from the melting pot, means for storing charges in said flue and in contact with the gases of combustion flowing in said flue to cause preheating of said charges, said flue having an opening remote from the melting pot, whereby additional charges may be placed into said storing means without exposing the contents of the melting pot to the atmosphere.

GUSTAV SCHWAB.